Sept. 28, 1943. E. M. SPLAINE 2,330,249
OPHTHALMIC MOUNTING
Filed June 15, 1942
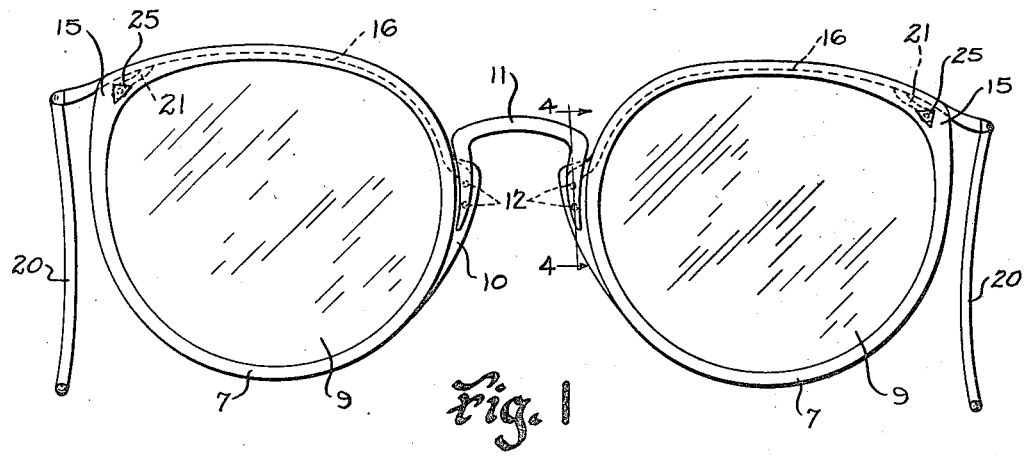
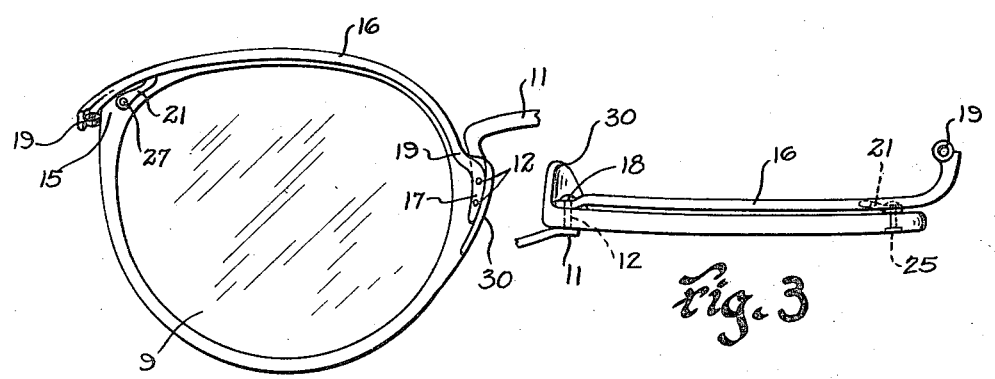
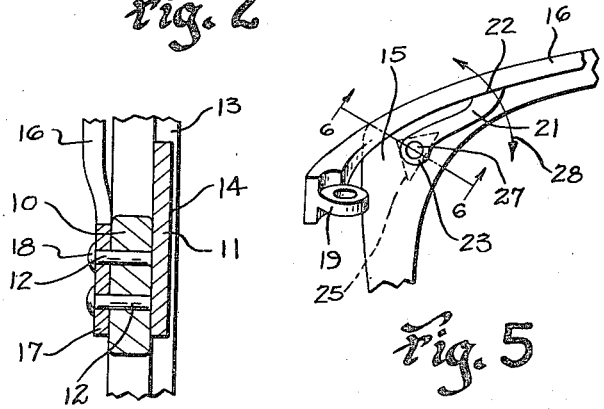
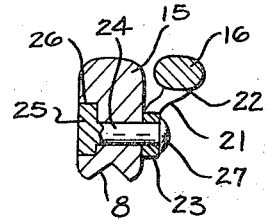
INVENTOR
EDWARD M. SPLAINE
BY
Louis L. Gagnon
ATTORNEY Patented Sept. 28, 1943

2,330,249

UNITED STATES PATENT OFFICE 2,330,249

OPHTHALMIC MOUNTING

Edward M. Splaine, Southbridge, Mass., assignor to American Optical Company, Southbridge, Mass., a voluntary association of Massachusetts Application June 15, 1942, Serial No. 447,017

10 Claims. (Cl. 88—41)

This invention relates to improvements in ophthalmic mountings and has particular reference to a novel construction and method of forming a mounting embodying combined metallic and non-metallic parts.

One of the principal objects of the invention is to provide an ophthalmic mounting of the type having continuous undivided lens rims formed of a non-metallic material of the type which may be heated and stretched and which will contract on cooling in combination with metallic parts for joining said lens rims and for supporting the temples whereby the temple supporting means will permit expansion and contraction of the rims for the insertion or removal of lenses and simultaneously be capable of adjustment to a relatively fixed position following substantially the upper contour shape of the rims.

Another object is to provide a mounting of the above character having relatively long and slender temple supports secured to the continuous rims adjacent the nasal and temporal sides thereof with the temporal connection embodying an adjustable portion so related with the long and slender temple support and with the rim as to permit said temple support to be raised or lowered with respect to the upper contour edge of the rim and also permit adjustment of said temple support toward and away from the rim so as to be disposed substantially entirely in the rear of said rim.

Another object is to provide a mounting of the above character with continuous lens supporting rims having attachment areas of increased thickness adjacent the nasal and temporal sides thereof in combination with long and slender metallic temple supports each having a flared end fixedly attached to the attachment area adjacent the nasal sides of the lens rims and shaped to follow substantially the upper contour edges of the rims and to turn rearwardly and downwardly with a relatively continuous sweeping curve to a temple attachment end and having relatively long adjustable means attached thereto adjacent the point on said supports at which the ends thereof turn rearwardly to the temple connection and having the major portion thereof disposed substantially in the direction of said temple support when viewed from the rear and having an end secured to the enlarged attachment portion on the temporal sides of the rims.

Another object is to provide a novel method of forming a mounting of the above character.

Another object is to provide long and slender temple supports of the above character with a portion intermediate the attachment means to the lens rims whereby said temple supports may be slightly increased or decreased in length.

Other objects and advantages of the invention will become apparent from the following description taken in connection with the accompanying drawing and it will be apparent that many changes may be made in the details of construction, arrangement of parts and method shown and described without departing from the spirit of the invention as expressed in the accompanying claims. I, therefore, do not wish to be limited to the exact details of construction and arrangement of parts as the preferred form has been given only by way of illustration.

Referring to the drawing:

Fig. 1 is a front elevation of the ophthalmic mounting embodying the invention;

Fig. 2 is a fragmentary rear elevational view showing the temple support and the attachment means for securing said support to the lens rims;

Fig. 3 is a plan view of one of the lens rims and temple support;

Fig. 4 is an enlarged sectional view taken as on line 4—4 of Fig. 1;

Fig. 5 is an enlarged fragmentary view of the temple supporting end of the mounting; and Fig. 6 is a slightly enlarged sectional view taken as on line 6—6 of Fig. 5.

Ophthalmic mountings formed of combined metallic and non-metallic parts are not new in the art nor are mountings of the above character having long and slender metallic temple supports new in the art but the long and slender temple supports of such mountings in the past were attached only adjacent the nasal sides of the lens rims. Some attempts have been made to attach the temporal ends of the long and slender supports to the lens rims but because of the fact that the rims are not divided and that they must be stretched in order to insert or remove the lenses difficulty was encountered in maintaining the temple supports and rims in proper relation with each other. If the lenses were oversized whereby the rims would not return to their initial dimension the temple supports and rims would not assume the desired intended relation with each other. Another difficulty was that the rims could not be stretched in all directions in order to permit the lenses to be placed therein without danger of having the parts become disconnected with each other during the stretching operation.

The present invention, therefore, is designed to overcome the above difficulties through the provision of novel means and method of attaching the long and slender temple supports to the rims whereby the rims are free to stretch in all directions with no danger of having the parts break loose from each other or become distorted and disaligned. If such disalignment should occur the attachment means is so formed as to permit the temple support to be adjusted independently of the rims so that the said temple supports may be properly aligned or shaped to follow the upper contour edges of the rims.

Referring to the drawing wherein like characters of reference designate like parts throughout the several views the mounting comprises a pair of lens rims 7 preferably formed of non-metallic material having characteristics which will permit the rims to be heated and stretched and which, upon cooling, will tend to return to their initial set. The lens rims 7, as shown in Fig. 6, have a continuous V-shaped groove or channel 8 therein to receive a similarly shaped bevelled edge on the contour edges of the lenses 9. The rims 7, adjacent the nasal sides thereof, are provided with integral attachment lugs 10 to which a suitable bridge 11 is attached by rivets or the like 12, see Fig. 4. The lugs 10 decrease in width in a downward direction and are tapered so as to blend adjacent the lower ends thereof with the contour edges of the lens rims 7. The said lugs 10 are recessed throughout the front surface 13, as shown in Fig. 4, so that the outer face 14 of the bridge 11 lies below the adjacent side surface of the rim or lies within the limits of the thickness of the rim. The said rims 7 adjacent the upper temporal sides thereof are provided with portions 15 of increased thickness to provide attachment areas to which the temple supports 16 may be attached. The temple supports 16 are preferably long and slender metallic bar-like portions each having a flattened end 17 provided with spaced openings through which the rivets or the like 12 carried by the bridge 11 may extend. This is best shown in Fig. 4 where it will be seen that the rivets 12 are preferably secured to the rear surface of the depending side surface of the bridge 11 and are adapted to extend through spaced openings formed in the lug 10 and to extend through similarly located spaced openings in the flattened ends 17 of the temple supports 16. The said rivets or the like 12 are then headed over, as illustrated at 18, to secure the parts in assembled relation with each other. The long and slender bar-like temple supports are provided with a bend 19 adjacent the flattened portion 17 and are adapted to extend from said bend along the upper contour of the rims in the rear thereof, as illustrated in Figs. 1 to 3 inclusive. The said temple supports progress outwardly to a point adjacent the enlarged attachment portion 15 and thence extend outwardly, rearwardly and downwardly as illustrated in Figs. 1, 2, 3 and 5 and terminate in temple pivotal connections 19 to which suitable temples 20 are pivotally attached. Each long and slender temple support, adjacent the outer temporal end thereof, is provided with a relatively long adjustable attachment portion 21 preferably secured, as illustrated at 22, to the under side of the temple support 16 by soldering, welding or the like, see Figs. 5 and 6. The portions 21, as shown in Figs. 2 and 5, extend outwardly substantially in the direction of the longitudinal axis of the temple support 16 and terminate in a perforated end 23 which is secured to the enlarged attachment portion 15 by a rivet or the like 24 having an enlarged head 25 which is set into a recess 26 in the front face of the attachment portion 15 so as to have its outer surface substantially flush with the outer surface of the attachment portion 15 when assembled therewith. The opposite end of the rivet or the like 24 is headed over, as illustrated at 27, to secure the end 23 of the portion 21 to the portion 15. It is to be noted that the upper and side contour edges of the portion 15 are shaped to blend with the adjacent outer surfaces of the rim 7. This is best seen in Fig. 1 and it is of a thickness sufficient to enable the rivet or the like 24 to extend through the said portion 15 without interfering with, or in desired spaced relation with, the V-shaped groove 8 of the rim and also to provide sufficient material on the side of the rim opposed to the V-shaped groove in order to prevent the rivet from breaking out of the rim during the use of the mounting. The portion of the temple supports which extends outwardly, rearwardly and downwardly relative to the adjacent portions of the rims, or the enlarged portions 15 of the rims, extends in said directions substantially at the location of said enlarged portions. The member 21 is so related with the temple support 16 and enlarged attachment portion 15 as to permit said temple support 16 to be raised or lowered relative to the upper contour edge of the rim by merely bending said portion 21 in a manner to cause it to rotate about the rivet or the like 24 in the directions indicated diagrammatically by the arrow 28 in Fig. 5. It is to be noted, by reference to Fig. 6, that the long and slender temple support 16 may be adjusted rearwardly or forwardly relative to the plane of the rear surface of the rim by bending said member 21 in a rearward or forward direction relative to the head of the rivet. By reason of the fact that the member 21 extends in the direction of the longitudinal axis of the adjacent portion of the long and slender temple support, as shown best in Fig. 5, it is apparent that the rims may be heated and stretched without resistance being introduced to said stretching by the long and slender temple supports 16 as the portions 21 are of yielding material which will permit said stretching of the rims to be accomplished and will permit said rims to contract upon cooling and securely hold the lenses 9 in the V-shaped grooves 8. During the stretching the attachment end 22 will cause said portion 21 to move about the rivet 24 in a radius diagrammatically illustrated by the curve of the arrows 28. The temple supports 16 may be formed of relatively rigid, ductile or resilient material or with portions thereof having one or more of said characteristics which will enable them to yield slightly during the stretching operation. After the lenses have been inserted in the rims through the heating and stretching, as set forth above, the long and slender temple supports 16 may be adjusted so as to follow substantially the upper contour shape of the rims by bending the brace member 21 intermediate the length thereof and the said temple supports may also be positioned in desired spaced relation with the rims, as illustrated in Fig. 6, by bending the brace member rearwardly or forwardly as required. The said portions 21, although long and adjustable, are substantially invisible when the mounting is viewed from the front as the said portions 15 of increased thickness serve to bring about this result. When the temple supports do not assume the desired relation with the rims adjacent the temporal sides thereof, the length of the temple supports may be increased or decreased slightly by increasing or decreasing the extent of the bend 19 and by also adjusting the member 21 to shift the point of attachment 22 inwardly or outwardly relative to the rivet or the like 24. This can be accomplished by forming an intermediate bend in the member 21. The member 21 and the bend 19 therefore provide ample means for adjusting the long and slender temple supports 16 to the desired relation with the adjacent portions of the rims.

The lugs 10 in the rear thereof are provided with integral nose bearing pads 30, as illustrated in Figs. 2 and 3, and the ends 17 of increased width and the rivet-like connecting means 12 are positioned on the side of said bearing pads 30 opposite the surface thereof which engages the nose of the wearer. The pads 30, therefore, function as shield-like means for protecting the adjacent attachment of the long and slender temple supports to the lugs 10 against exposure to perspiration, etc., which might tend to cause the attachment portions to corrode and become impractical for use.

The bridge 11 is preferably formed of a metallic material whereby it may be adjusted to position the lens rims 7 in desired spaced relation with each other, while the adjustable portion 21 affords ease in assembling the rims to the lenses and permits the long and slender temple supports to be adjusted in proper relation with the lens rims. Its characteristics are such as to tend to retain said temple supports in said adjusted position during the use of the mounting. The resultant lens rims of the resultant mounting therefore have substantially uninterrupted outer contour surfaces throughout the temple sides thereof even though the areas 15 of increased width are provided for receiving the attachment rivet 24 for the member 21. The temple supports, by reason of the fact that they are secured to the rear of the lens rims, remove all parts which might protrude from the rims in the plane thereof on the temporal sides as has been usual with mountings of the type having the temple supporting lugs formed integrally with the rims and thereby position the mounting in more intimate relation with the face at the sides. The head 25, as shown in Fig. 1, is preferably of triangular shape but it is to be understood that it may be formed of other suitable shapes. The shape, however, should be irregular so as to interlock with the recess 26 to prevent rotation of the rivet 24 during the adjustment of the long and slender temple supports 16 or during the insertion or removal of the lenses from the rims.

It is to be noted, however, that the inner surface of the end 23 is disposed substantially in the plane of the rear surface of the portions 15, that is, it is not embedded so as to be hindered in its possible rotary action about the rivet 24 during the adjustment of the portion 21. This is best seen in Fig. 6.

The parts are all assembled with each other so as to eliminate, as much as possible, looseness and play.

From the foregoing description it will be seen that simple, efficient and durable means and method have been provided for accomplishing all of the objects and advantages of the invention.

Having described my invention, I claim:

1. A lens supporting structure for the lenses of an ophthalmic mounting comprising a pair of continuous undivided non-metallic lens rims each having an attachment lug on the nasal side thereof protruding outwardly of the general contour line of the rim with said rims having a portion of an enlarged cross-sectional dimension on the upper temporal sides thereof, a normally separate bridge member secured to each of the attachment lugs on the nasal sides of the rims with a portion thereof overlying a side surface of each of said attachment lugs and being adapted to support the lens rims in desired spaced relation with each other, relatively long and slender bar-like metallic temple supports having an end secured to the attachment lugs on the side thereof opposed to the bridge by securing means extending through the said attachment lugs and connected with the bridge and with the ends of the temple supports, the major portion of the length of the temple supports being shaped substantially to follow the upper contour shape of the lens rims with said temple supports terminating in rearwardly extending temple connection ends, and an adjustable brace member secured adjacent one end thereof to the temple support at a point spaced inwardly of the temple connection end and extending from said secured end outwardly substantially in the direction of the circumferential line of the rim and terminating in a normally free end secured to the portion of the rim of larger cross-sectional dimension by a connecting member extending through said rim.

2. A lens supporting structure for the lenses of an opthalmic mounting comprising a pair of continuous undivided non-metallic lens rims each having an attachment lug on the nasal side thereof protruding outwardly of the general contour line of the rim with said rims having a portion of an enlarged cross-sectional dimension on the upper temporal sides thereof, a normally separate bridge member secured to each of the attachment lugs on the nasal sides of the rims with a portion thereof overlying a side surface of each of said attachment lugs and being adapted to support the lens rims in desired spaced relation with each other, relatively long and slender bar-like metallic temple supports having an end secured to the attachment lugs on the side thereof opposed to the bridge by securing means extending through the said attachment lugs and connected with the bridge and with the ends of the temple supports, the major portion of the length of the temple supports being shaped substantially to follow the upper contour shape of the lens rims with said temple supports terminating in rearwardly extending temple connection ends, and an adjustable brace member secured adjacent one end thereof to the temple support at a point spaced inwardly of the temple connection end and extending from said secured end outwardly substantially in the direction of the circumferential line of the rim and terminating in a normally free end secured to the portion of the rim of larger cross-sectional dimension by a connecting member extending through said rim, said connecting member being so associated with the normally free end of the brace member as to permit pivotal movement of said end relative to the rim during the adjustment of said brace member.

3. A lens supporting structure for the lenses of an ophthalmic mounting comprising a pair of continuous undivided non-metallic lens rims each having an attachment lug on the nasal side thereof protruding outwardly of the general contour line of the rim with said rims having a portion of an enlarged cross-sectional dimension on the upper temporal sides thereof, a normally separate bridge member secured to each of the attachment lugs on the nasal sides of the rims with a portion thereof overlying a side surface of each of said attachment lugs and being adapted to support the lens rims in desired spaced relation with each other, relatively long and slender bar-like metallic temple supports each having a flared end secured to the side surface of the attachment lugs which is opposed to the bridge by spaced securing means extending through the said attachment lugs and connected with the bridge and with the flared ends of the temple supports, the major portion of the length of the temple supports being shaped substantially to follow the upper contour shape of the lens rims with said temple supports terminating in rearwardly extending temple connection ends, and an adjustable brace member secured adjacent one end thereof to the underside of the temple support at a point spaced inwardly of the temple connection end and inwardly of the adjacent edge of the rim and extending from said secured end outwardly substantially in the direction of the circumferential line of the rim and terminating in a normally free end secured to the portion of the rim of larger cross-sectional dimension by a connecting member extending through said rim.

4. A lens supporting structure for the lenses of an ophthalmic mounting comprising a pair of continuous undivided non-metallic lens rims each having an attachment lug on the nasal side thereof protruding outwardly of the general contour line of the rim with said rims having a portion of an enlarged cross-sectional dimension on the upper temporal sides thereof, a normally separate bridge member secured to each of the attachment lugs on the nasal sides of the rims with a portion thereof overlying a side surface of each of said attachment lugs and being adapted to support the lens rims in desired spaced relation with each other, relatively long and slender bar-like metallic temple supports each having a flared end secured to the side surface of the attachment lugs which is opposed to the bridge by spaced securing means extending through the said attachment lugs and connected with the bridge and with the flared ends of the temple supports, the major portion of the length of the temple supports being shaped substantially to follow the upper contour shape of the lens rims with said temple supports terminating in rearwardly extending temple connection ends, and an adjustable brace member secured adjacent one end thereof to the underside of the temple support at a point spaced inwardly of the temple connection end and inwardly of the adjacent edge of the rim and extending from said secured end outwardly substantially in the direction of the circumferential line of the rim and terminating in a normally free end secured to the portion of the rim of larger cross-sectional dimension by a connecting member extending through said rim, said connecting member being so associated with the normally free end of the brace member as to permit pivotal movement of said end relative to the rim during the adjustment of said brace member.

5. A lens supporting structure for the lenses of an ophthalmic mounting comprising a pair of continuous undivided non-metallic lens rims each having an attachment lug on the nasal side thereof protruding outwardly of the general contour line of the rim with said rims having a portion of an enlarged cross-sectional dimension on the upper temporal sides thereof, a normally separate bridge member secured to each of the attachment lugs on the nasal sides of the rims with a portion thereof overlying a side surface of each of said attachment lugs and being adapted to support the lens rims in desired spaced relation with each other, relatively long and slender bar-like metallic temple supports having an end secured to the side surface of the attachment lugs which is opposed to the bridge by securing means extending through the said attachment lugs and connected with the bridge and with the ends of the temple supports, the major portion of the length of the temple supports being shaped substantially to follow the upper contour shape of the lens rims with said temple supports terminating in rearwardly extending temple connection ends, and an adjustable brace member secured adjacent one end thereof to the temple support and extending from said temple support outwardly substantially in the direction of the circumferential line of the rim and terminating in a normally free perforated end secured to the portion of the rim of larger cross-sectional dimension by a connecting member extending through said rim and the perforated end.

6. An ophthalmic mounting comprising a pair of lenses, continuous undivided non-metallic lens rims on said lenses each having an attachment lug on the nasal side thereof protruding outwardly of the general contour line of the rim with said rims having a portion of an enlarged cross-sectional dimension on the upper temporal sides thereof, a normally separate bridge member secured to each of the attachment lugs on the nasal sides of the rims with a portion thereof overlying a side surface of each of said attachment lugs and being adapted to support the lens rims in desired spaced relation with each other, relatively long and slender bar-like metallic temple supports having an end secured to the attachment lugs on the side thereof opposed to the bridge by securing means extending through the said attachment lugs and connected with the bridge and with the ends of the temple supports, the major portion of the length of the temple supports being shaped substantially to follow the upper contour shape of the lens rims with said temple supports terminating in rearwardly extending temple connection ends, and an adjustable brace member secured adjacent one end thereof to the temple support at a point spaced inwardly of the temple connection end and extending from said secured end outwardly substantially in the direction of the circumferential line of the rim and terminating in a normally free end secured to the portion of the rim of larger cross-sectional dimension by a connecting member extending through said rim.

7. An ophthalmic mounting comprising a pair of lenses, continuous undivided non-metallic lens rims on said lenses each having an attachment lug on the nasal side thereof protruding outwardly of the general contour line of the rim with said rims having a portion of an enlarged cross-sectional dimension on the upper temporal sides thereof, a normally separate bridge member secured to each of the attachment lugs on the nasal sides of the rims with a portion thereof overlying a side surface of each of said attachment lugs and being adapted to support the lens rims in desired spaced relation with each other, relatively long and slender bar-like metallic temple supports having an end secured to the attachment lugs on the side thereof opposed to the bridge by securing means extending through the said attachment lugs and connected with the bridge and with the ends of the temple supports, the major portion of the length of the temple supports being shaped substantially to follow the upper contour shape of the lens rims with said temple supports terminating in rearwardly extending temple connection ends, and an adjustable brace member secured adjacent one end thereof to the temple support at a point spaced inwardly of the temple connection end and extending from said secured end outwardly substantially in the direction of the circumferential line of the rim and terminating in a normally free end secured to the portion of the rim of larger cross-sectional dimension by a connecting member extending through said rim, said connecting member being so associated with the normally free end of the brace member as to permit pivotal movement of said end relative to the rim during the adjustment of said brace member.

8. An ophthalmic mounting comprising a pair of lenses, continuous undivided non-metallic lens rims on said lenses each having an attachment lug on the nasal side thereof protruding outwardly of the general contour line of the rim with said rims having a portion of an enlarged cross-sectional dimension on the upper temporal sides thereof, a normally separate bridge member secured to each of the attachment lugs on the nasal sides of the rims with a portion thereof overlying a side surface of each of said attachment lugs and being adapted to support the lens rims in desired spaced relation with each other, relatively long and slender bar-like metallic temple supports each having a flared end secured to the side surface of the attachment lugs which is opposed to the bridge by spaced securing means extending through the said attachment lugs and connected with the bridge and with the flared ends of the temple supports, the major portion of the length of the temple supports being shaped substantially to follow the upper contour shape of the lens rims with said temple supports terminating in rearwardly extending temple connection ends, and an adjustable brace member secured adjacent one end thereof to the underside of the temple support at a point spaced inwardly of the temple connection end and inwardly of the adjacent edge of the rim and extending from said secured end outwardly substantially in the direction of the circumferential line of the rim and terminating in a normally free end secured to the portion of the rim of larger cross-sectional dimension by a connecting member extending through said rim.

9. An ophthalmic mounting comprising a pair of lenses, continuous undivided non-metallic lens rims on said lenses each having an attachment lug on the nasal side thereof protruding outwardly of the general contour line of the rim with said rims having a portion of an enlarged cross-sectional dimension on the upper temporal sides thereof, a normally separate bridge member secured to each of the attachment lugs on the nasal sides of the rims with a portion thereof overlying a side surface of each of said attachment lugs and being adapted to support the lens rims in desired spaced relation with each other, relatively long and slender bar-like metallic temple supports each having a flared end secured to the side surface of the attachment lugs which is opposed to the bridge by spaced securing means extending through the said attachment lugs and connected with the bridge and with the flared ends of the temple supports, the major portion of the length of the temple supports being shaped substantially to follow the upper contour shape of the lens rims with said temple supports terminating in rearwardly extending temple connection ends, and an adjustable brace member secured adjacent one end thereof to the underside of the temple support at a point spaced inwardly of the temple connection end and inwardly of the adjacent edge of the rim and extending from said secured end outwardly substantially in the direction of the circumferential line of the rim and terminating in a normally free end secured to the portion of the rim of larger cross-sectional dimension by a connecting member extending through said rim, said connecting member being so associated with the normally free end of the brace member as to permit pivotal movement of said end relative to the rim during the adjustment of said brace member.

10. An ophthalmic mounting comprising a pair of lenses, continuous undivided non-metallic lens rims on said lenses each having an attachment lug on the nasal side thereof protruding outwardly of the general contour line of the rim with said rims having a portion of an enlarged cross-sectional dimension on the upper temporal sides thereof, a normally separate bridge member secured to each of the attachment lugs on the nasal sides of the rims with a portion thereof overlying a side surface of each of said attachment lugs and being adapted to support the lens rims in desired spaced relation with each other, relatively long and slender bar-like metallic temple supports having an end secured to the side surface of the attachment lugs which is opposed to the bridge by securing means extending through the said attachment lugs and connected with the bridge and with the ends of the temple supports, the major portion of the length of the temple supports being shaped substantially to follow the upper contour shape of the lens rims with said temple supports terminating in rearwardly extending temple connection ends, and an adjustable brace member secured adjacent one end thereof to the temple support and extending from said temple support outwardly substantially in the direction of the circumferential line of the rim and terminating in a normally free perforated end secured to the portion of the rim of larger cross-sectional dimension by a connecting member extending through said rim and the perforated end.

EDWARD M. SPLAINE.